United States Patent
Calcagnotto Da Silva et al.

(10) Patent No.: US 11,433,956 B2
(45) Date of Patent: Sep. 6, 2022

(54) VEHICLE AND METHOD OF CONTROLLING A LOAD DISTRIBUTION OF A VEHICLE

(71) Applicant: DANA ITALIA S.R.L., Arco (IT)

(72) Inventors: Josemir Calcagnotto Da Silva, Gravatai (BR); Lorenzo Serrao, Nago-Torbole (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 17/029,645

(22) Filed: Sep. 23, 2020

(65) Prior Publication Data

US 2021/0086848 A1    Mar. 25, 2021

(30) Foreign Application Priority Data

Sep. 25, 2019   (EP) .................................... 19199703

(51) Int. Cl.
*B62D 49/08*    (2006.01)
*B60K 28/14*    (2006.01)

(52) U.S. Cl.
CPC ............ *B62D 49/085* (2013.01); *B60K 28/14* (2013.01); *B60Y 2300/02* (2013.01)

(58) Field of Classification Search
CPC ......... E02F 9/18; B66C 23/72; B62D 49/085; B62D 37/04; B60K 28/14; B60Y 2300/02
See application file for complete search history.

(56) References Cited

U.S. PATENT DOCUMENTS

| 4,861,069 A | 8/1989 | Gunter | |
| 8,807,910 B1 * | 8/2014 | Roden | B62D 49/085 |
| | | | 414/719 |
| 2021/0403103 A1 * | 12/2021 | Alshaalan | B66F 9/07559 |

FOREIGN PATENT DOCUMENTS

| EP | 1995157 A1 | 11/2008 | |
| FR | 2815319 A1 | 4/2002 | |
| KR | 940007974 Y1 * | 11/1994 | |
| KR | 101552554 B1 * | 9/2015 | |
| WO | 2016045869 A1 | 3/2016 | |
| WO | WO-2016045868 A1 * | 3/2016 | G06N 5/04 |
| WO | WO-2017085620 A1 * | 5/2017 | B62D 49/0628 |

OTHER PUBLICATIONS

Machine translation of FR 2815319 A1 from espacenet.com Sep. 2021.*
European Patent Office, Extended European Search Report Issued in Application No. 19199703.0, dated Apr. 3, 2020, Germany, 7 pages.

* cited by examiner

Primary Examiner — Paul N Dickson
Assistant Examiner — Maxwell L Meshaka
(74) Attorney, Agent, or Firm — McCoy Russell LLP (57) ABSTRACT

The present disclosure relates to a vehicle, in particular an off-highway vehicle, comprising a first axle and a second axle and a sensor unit comprising at least one load sensor configured to produce a load sensor signal indicative of a load on at least one of the first axle and the second axle. The vehicle further comprises a movable weight configured to be moved relative to the first axle and to the second axle, an actuator system configured to move the movable weight relative to the first axle and to the second axle, and a control unit configured to control the actuator system based at least on the load sensor signal.

19 Claims, 4 Drawing Sheets

VEHICLE AND METHOD OF CONTROLLING A LOAD DISTRIBUTION OF A VEHICLE

CROSS-REFERENCE TO RELATED APPLICATIONS

The present application claims priority to European Application No. 19199703.0, entitled "VEHICLE AND METHOD OF CONTROLLING A LOAD DISTRIBUTION OF A VEHICLE", and filed on Sep. 25, 2019. The entire contents of the above-listed application are hereby incorporated by reference for all purposes.

TECHNICAL FIELD

The present application relates to a vehicle and to a method of controlling a load distribution of a vehicle. Vehicles of the presently proposed type may be off-highway vehicles, for example agriculture or forestry vehicles such as forage harvesters, combine harvesters, tractors, or the like.

BACKGROUND AND SUMMARY

Off-highway vehicles such as agriculture vehicles are known for delivering high traction forces at slow speeds to complete agriculture tasks such as towing trailers, agriculture machinery, agriculture implements, or the like. Due to the variety of the agriculture tasks and the off-highway conditions, an agriculture vehicle requires an adjustable load distribution depending on the specific agriculture task and off-highway condition in order to provide a high traction force when performing the agriculture task.

Typically, the load of a vehicle is distributed among the axles of the vehicle and the wheels, respectively. The traction force is a force which generates the motion between the vehicle and the ground. For example, when an agriculture vehicle starts towing an implement touching the soil, the front axle of the agriculture vehicle lifts because of the resistance caused by the implement touching the soil. As a result, the agriculture vehicle suffers a loss in traction force. The reduced traction force may be insufficient to overcome the friction caused by the implement and requires increasing the fuel consumption of the agriculture vehicle in order to compensate the loss in traction force.

The load distributions of the agriculture vehicles of prior art are adjusted by equipping static counterweights to the agriculture vehicle to keep losses in traction force as small as possible and to prevent axle lift effects. The counterweights are changed manually according to a specific table provided by the producer of the vehicle based on the agriculture task. When being equipped with the counterweights, the agriculture vehicle has to stop or to be parked, thereby wasting precious time which could be spent on performing the agriculture task. Moreover, since the counterweights are usually stored in a farmer's cellar or garage, the equipping or changing procedure needs to be done at the farmyard. The requirement of driving to a certain location to adjust the load distribution of the vehicle is time-consuming and inefficient.

Thus, the inventors herein have recognized a demand for a vehicle such as an agriculture vehicle automatically adjusting or presetting the load distribution without the need of parking or of driving to a certain location in order to adjust the load distribution of the vehicle manually, thereby saving time and fuel.

These issues are at least partly addressed by a vehicle, in particular an off-highway vehicle, that comprises a first axle and a second axle, a sensor unit comprising at least one load sensor configured to produce a load sensor signal indicative of a load on at least one of the first axle and the second axle, and a movable weight configured to be moved relative to the first axle and to the second axle. The vehicle further comprises an actuator system configured to move the weight relative to the first axle and to the second axle and a control unit configured to control the actuator system based at least on the load sensor signal.

The load distribution of the presently proposed vehicle can be adjusted by moving the movable weight relative to the first axle and/or to the second axle by actuating the actuator system. The control unit processes the load sensor signals detected by the sensor unit in real time and controls the actuator system based on the processed load sensor signals. Therefore, the load distribution of the presently proposed vehicle can be adjusted dynamically based on the load sensor signals in real time. Consequently, the load distribution of the presently proposed vehicle can be optimized to obtain an optimal traction force for each individual task and off-highway condition. Instead of driving into a garage and equipping or changing static counterweights to adjust the load distribution of the vehicle, the load distribution can be changed automatically and independently from the current location of the vehicle. For example, the distribution load of the presently proposed vehicle may be adjusted before, during, and/or after the individual task and/or between two individual tasks without wasting time by stopping the vehicle and adjusting counterweights manually. Thus, the presently proposed vehicle provides an improved efficiency with regard to time and traction force.

For example, the current load on the first axle and/or the second axle of the proposed vehicle may be detected by measuring signals of the vertical force and/or the horizontal force exerted on the first axle and/or the second axle with the load sensor such as a force sensor or a strain sensor in real time. The vertical force is a force in a vertical direction perpendicular to the first axle and/or perpendicular to the second axle. The vertical force may be parallel to the direction of the gravitational force. The horizontal force is a force in a lateral direction in parallel to the direction of the first axle and/or the second axle of the vehicle. The vertical force and/or the horizontal force exerted on the first axle and/or the second axle may vary from one individual task to another such as, for example, plowing, planting, harvesting, and/or the like and from one off-highway condition to another such as, for example, soil density, soil topology, inclination, and/or the like. When the load sensor detects a variation in vertical force and/or in horizontal force exerted on the first axle and/or the second axle, the control unit actuates the actuator system to move the movable weight according to the measured signals of the vertical force and/or the horizontal force. In this way, the control unit controls the load distribution of the vehicle and equilibrates the vertical forces and/or the horizontal forces exerted on the first axle and/or the second axle. Therefore, the control unit optimizes the traction force of the vehicle by balancing the forces exerted on the first axle and/or the second axle by moving the movable weight accordingly and decreases the risk of axle lift or axle drop effects and losses in traction force.

The load sensor of the sensor unit may be arranged on the first axle or the second axle. For example, the load sensor may be arranged on an axle shaft bearing of the first axle or the second axle.

The actuator system may be coupled to the movable weight and configured to receive signals from the control unit. The actuator system may comprise an extendable piston which is configured to displace the movable weight according to the received signal.

The control unit may comprise a power supply unit, a power output unit for the actuator system, input and output connectors for receiving sensor signals and transmitting processed data to control the actuator system and/or a PID-controller for processing sensor signals and controlling the actuator system.

The movable weight may be disposed on or configured to be disposed on a side of the first axle facing away from the second axle. A movable weight disposed on a side of the first axle facing away from the second axle is further away from the center of mass of the vehicle than a movable weight arranged between the first axle and the second axle of the vehicle. Due to the leverage effect, the movable weight further away from the center of mass requires less distance to be covered and/or is capable of exerting larger forces than a movable weight arranged between the first axle and the second axle of the vehicle. By decreasing the movement distance of the movable weight, the required time to move the movable weight can be reduced. In addition, the overall weight of the movable weight can be reduced in comparison to the weight arranged between the first axle and the second axle. Thus the overall fuel consumption of the vehicle can be reduced.

The movable weight may be configured to be moved in a lateral direction in parallel to the first axle and/or in parallel to the second axle. By moving the movable weight in the lateral direction, the control unit may be configured to control the load distribution of the vehicle in the lateral direction and/or the roll behavior of the vehicle. Controlling the load distribution in the lateral direction becomes useful when the vehicle drives perpendicular to an inclination, in particular, when an off-highway terrain is particularly uneven and/or comprises slopes. As a result, traction force losses due to a lateral imbalance of the load distribution on the first axle and/or the second axle can be reduced and the traction force of the vehicle can be optimized. Furthermore, the lateral stability of the vehicle may be improved.

The movable weight may additionally or alternatively be configured to be moved in a longitudinal direction perpendicular to the first axle and/or perpendicular to the second axle. The control unit may be configured to control the load distribution of the vehicle in the longitudinal direction. In this way, the load distribution of the vehicle in the longitudinal direction and/or the pitch behavior of the vehicle can be adjusted by moving the movable weight in the longitudinal direction to optimize the traction force of the vehicle.

The actuator system may include at least one of a hydraulic actuator, a pneumatic actuator, and an electromagnetic actuator.

The actuator system may include at least one hydraulic cylinder and at least one valve for controlling the at least one hydraulic cylinder. The valve may be a proportional control valve.

The vehicle may further comprise a vehicle frame, wherein the actuator system may include at least one actuator mounted on the vehicle frame and at least one slide guide mounted on the vehicle frame, wherein the movable weight may be slidably arranged on the at least one slide guide. The actuator may be directed along the direction of the slide guide to move the movable weight along the slide guide. Since the vehicle frame is typically at least indirectly mounted on the first and/or the second axle of the vehicle, the movable weight may be moved relative to the first axle and/or the second axle by sliding the movable weight on the slide guide.

The at least one slide guide may include at least one of a longitudinal slide guide configured to guide the movable weight along a longitudinal direction perpendicular to the first axle and/or perpendicular to the second axle, and a lateral slide guide configured to guide the movable weight along a lateral direction in parallel to the first axle and/or in parallel to the second axle. The movement of movable weight may be provided in the lateral direction with the lateral slide guide and in the longitudinal direction with the longitudinal slide guide. By implementing the combination of the lateral slide guide and the longitudinal slide guide, the movable weight can be adjusted in the lateral direction and in the longitudinal direction. Therefore, the control unit may be capable of balancing the load distribution of the vehicle in the lateral direction and the longitudinal direction. Thus, the risk that the vehicle suffers a loss in traction force due to an imbalance in load distribution can be further reduced.

At least one of the at least one actuator may be rotatably mounted on the vehicle frame with respect to a rotation axis in parallel to a yaw axis of the vehicle. A rotatably mounted actuator may be necessary when the vehicle comprises two or more actuators and/or two or more slide guides in different directions. For example, when the vehicle comprises a first actuator configured to move the movable weight along a longitudinal slide guide and a second actuator configured to move the movable weight along a lateral slide guide. When the first actuator pushes the movable weight in a longitudinal direction, it may be necessary that the second actuator rotatably follows the position of the movable weight to be still capable of pushing the movable weight in the lateral direction. This may prevent the second actuator to push at nothing when the movable weight would have been pushed too far by the first actuator.

The sensor unit may comprise a first load sensor configured to produce a load sensor signal indicative of a load on the first axle, and a second load sensor configured to produce a load sensor signal indicative of a load on the second axle, wherein the control unit may be configured to control the actuator system based on the first load sensor signal and based on the second load sensor signal. By obtaining and additionally processing load sensor signals of the first axle and the second axle, the difference between the determined load distribution of the vehicle and the actual load distribution of the vehicle can be reduced. Thus, the efficiency of achieving an optimized traction force by adjusting the movable weight may be increased.

The sensor unit may comprise an attitude sensor configured to produce an attitude sensor signal indicative of an attitude of the vehicle, wherein the control unit may be configured to control the actuator system based on the attitude sensor signal. By obtaining and additionally processing attitude sensor signals indicative of an attitude of the vehicle, the difference between the determined load distribution of the vehicle and the actual load distribution of the vehicle can be reduced. Thus, the efficiency of achieving an optimized traction force by adjusting the movable weight may be increased.

The attitude sensor may include at least one of a roll angle sensor configured to produce a roll angle sensor signal indicative of a roll angle of the vehicle and a pitch angle sensor configured to produce a pitch angle sensor signal indicative of a pitch angle of the vehicle, wherein the control unit may be configured to control the actuator system based on at least one of the roll angle sensor signal and the pitch angle sensor signal. Roll angle sensor signals may be indicative of the load distribution of the vehicle in the lateral direction. Pitch angle sensor signals may indicate the load distribution of the vehicle in the longitudinal direction. By obtaining and additionally processing roll angle and/or pitch angle sensor signals of the vehicle, the difference between the determined and the actual load distribution of the vehicle in the lateral direction and/or the determined and the actual load distribution of the vehicle in the longitudinal direction can be reduced. Thus, the efficiency of achieving an optimized traction force by adjusting the movable weight may be increased.

The sensor unit may comprise an acceleration sensor configured to produce an acceleration sensor signal indicative of an acceleration of the vehicle, wherein the control unit may be configured to control the actuator system based on the acceleration sensor signal. The acceleration may be determined in the vertical direction and/or in the lateral direction and/or in the longitudinal direction. The acceleration sensor signal indicative of the acceleration in the vertical direction may be used to determine a static load distribution in the direction of gravity. The acceleration sensor signal indicative of the acceleration in the lateral direction and/or in the longitudinal direction may be used to detect dynamic instabilities, for example, in case of a sudden acceleration of the vehicle in the longitudinal and/or in the lateral direction. By obtaining and additionally processing acceleration sensor signals of the vehicle, the difference between the determined and the actual load distribution of the vehicle can be reduced. Thus, the efficiency of achieving an optimized traction force by adjusting the movable weight may be increased.

Further, a method of controlling a load distribution on a first axle and on a second axle of a vehicle, in particular of the above-described vehicle, is presently proposed. The method comprising the steps:

i. producing a load sensor signal indicative of a load on at least one of the first axle and the second axle, and ii. displacing a movable weight relative to the first axle and to the second axle based on the load sensor signal.

In this method, the movable weight may be moved on a side of the first axle facing away from the second axle, and/or the movable weight may be moved in a lateral direction in parallel to at least one of the first axle and the second axle.

BRIEF DESCRIPTION OF THE FIGURES

Embodiments of the presently proposed vehicle and method of controlling a load distribution of a vehicle are described in the following detailed description and are depicted in the figures in which FIG. 1 schematically shows an embodiment of the presently proposed vehicle in a lateral view.

DETAILED DESCRIPTION

Figure 1:
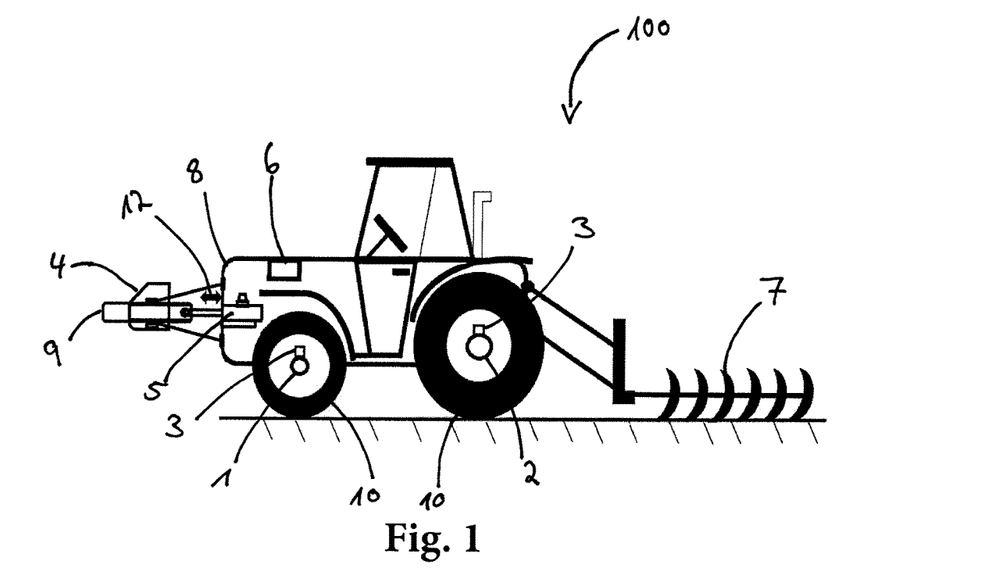
Figure 2:
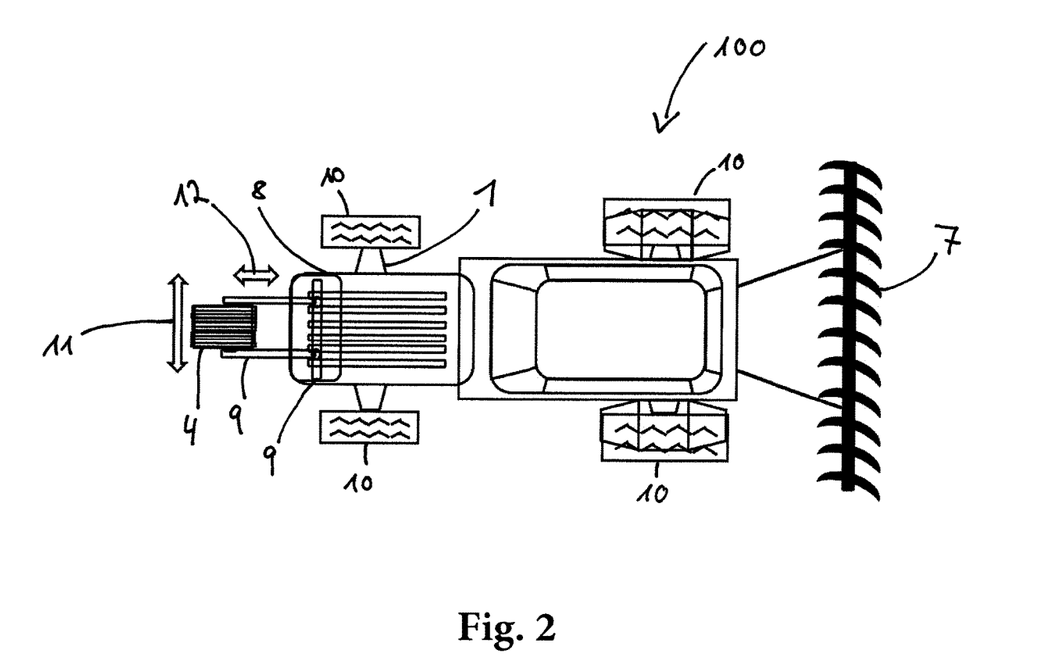
FIG. 2 schematically shows the vehicle of FIG. 1 in a top view.

FIGS. 1 and 2 show schematically an embodiment of the presently proposed vehicle 100 in the lateral view and in the top view, respectively. The vehicle 100 is depicted as a tractor but may also be any other off-highway vehicle, in particular an agriculture or forestry vehicle such as a forage harvester, a combine harvester, a forestry machine, or the like. The vehicle 100 comprises a first axle 1 and a second axle 2 and a sensor unit 3 comprising a first load sensor configured to produce a load sensor signal indicative of a load on the first axle 1 and a second load sensor configured to produce a load sensor signal indicative of a load on the second axle 2. The two load sensors of the sensor unit 3 are configured to produce real time signals indicative of the vertical force and the horizontal force exerted on the first axle 1 and the second axle 2, respectively. The load sensors may be a force sensor or a strain sensor. The vertical force is a force in a vertical direction perpendicular to the first axle 1 and the second axle 2. The vertical force is parallel to the direction of the gravitational force. The horizontal force is a force in a lateral direction in parallel to the direction of the first axle 1 and the second axle 2 of the vehicle 100. The first axle 1 and the second axle 2 are the front axle and the rear axle of the tractor, respectively. The first axle 1 and the second axle 2 are coupled to two wheels 10, respectively. The first load sensor and the second load sensor are arranged on the first axle 1 and the second axle 2, respectively. The obtained load sensor signals are used to determine a load distribution of the vehicle 100 in real time. The determined load distribution is necessary to gain information about the current traction force of the vehicle 100.

The sensor unit 3 may also comprise at least one of an attitude sensor configured to produce an attitude sensor signal indicative of an attitude of the vehicle 100 and an acceleration sensor configured to produce an acceleration sensor signal indicative of an acceleration of the vehicle 100. The attitude sensor may comprise a roll angle sensor configured to produce a roll angle sensor signal indicative of a roll angle of the vehicle 100 and/or a pitch angle sensor configured to produce a pitch angle sensor signal indicative of a pitch angle of the vehicle 100. The additionally obtained sensor signals may be used for reducing a difference between the determined load distribution of the vehicle 100 and the actual load distribution of the vehicle 100.

Furthermore, the vehicle 100 comprises a movable weight 4 configured to be moved relative to the first axle 1 and to the second axle 2 and an actuator system 5 configured to move the movable weight 4 relative to the first axle 1 and to the second axle 2. The actuator system 5 may include at least one of a hydraulic actuator, a pneumatic actuator, and an electromagnetic actuator. When the actuator system 5 includes a hydraulic actuator, the actuator system 5 may include at least one hydraulic cylinder 15 and at least one valve 16 for controlling the at least one hydraulic cylinder 15. The valve 16 may be a proportional valve. The movable weight 4 is disposed on a side of the first axle 1 facing away from the second axle 2. The movable weight 4 which is arranged away from the center of mass of the vehicle 100 exploits leverage. Thus, the distance to be covered by the movable weight 4 and the overall weight of the movable weight 4 can be reduced. Alternatively, the movable weight 4 or an additional movable weight 4 may also be disposed on a side of the second axle 2 facing away from the first axle 1 and/or between the first axle 1 and the second axle 2.

Furthermore, the movable weight 4 can be moved in a lateral direction 11 in parallel to the first axle 1 and in parallel to the second axle 2 and in a longitudinal direction 12 perpendicular to the first axle 1 and perpendicular to the second axle 2 by the actuator system 5. In this way, the load distribution of the vehicle 100 can be adjusted in the lateral direction 11 and the longitudinal direction 12 by moving the movable weight 4 in the lateral direction 11 and the longitudinal direction 12, respectively, to optimize the traction force of the vehicle 100. Moreover, the roll behavior and the pitch behavior of the vehicle 100 can be controlled by moving the movable weight 4.

The vehicle 100 further comprises a vehicle frame 8 and two slide guides 9. The two slide guides 9 are a longitudinal slide guide configured to guide the movable weight 4 along a longitudinal direction 12 and a lateral slide guide configured to guide the movable weight 4 along a lateral direction 11. The movable weight 4 is slidably arranged on the slide guides 9. The two actuators of the actuator system 5 (only one actuator is shown) and the two slide guides 9 are mounted on the vehicle frame 8. The slide guides 9 are coupled to the actuators of the actuator system 5.

The vehicle 100 additionally comprises a control unit 6 configured to control the actuator system 5 based on the load sensor signals. The control unit 6 processes the acquired load sensor signals to determine the current load distribution of the vehicle 100. The control unit 6 compares the determined load distribution data with stored data. In case the determined load distribution of the vehicle 100 differs from an optimal load distribution given by the stored data, the control unit 6 calculates a target location of the movable weight 4 in order to balance the load distribution and transmits the target location signal to the actuator system 5. The actuator system 5 includes two actuators which move the movable weight 4 to the calculated target location based on the target location signal received from the control unit 6. The control unit 6 may further be configured to control the actuator system 5 based on at least one of the attitude sensor signal indicative of an attitude of the vehicle 100 and the acceleration sensor signal indicative of an acceleration of the vehicle 100. The attitude sensor signal may be a roll angle sensor signal indicative of a roll angle of the vehicle 100 and/or a pitch angle sensor signal indicative of a pitch angle of the vehicle 100.

The forces exerted on the first axle 1 and the second axle 2, in particular, the vertical force and the horizontal force, vary from one individual task to another and from one off-highway condition to another. As shown in FIG. 1 on an exemplary basis, the vehicle 100 is coupled to an implement 7 to perform the exemplary agriculture task "plowing". The implement 7 touches the soil and causes resistance when the vehicle 100 starts moving the implement 7 along the soil. It may be clear that there are different types of agriculture or forestry tasks such as planting, harvesting, towing trailers, agriculture machinery, agriculture implements, or the like. The off-highway conditions may be, for example, soil density, soil topology, inclination, and/or the like.

Figure 3:
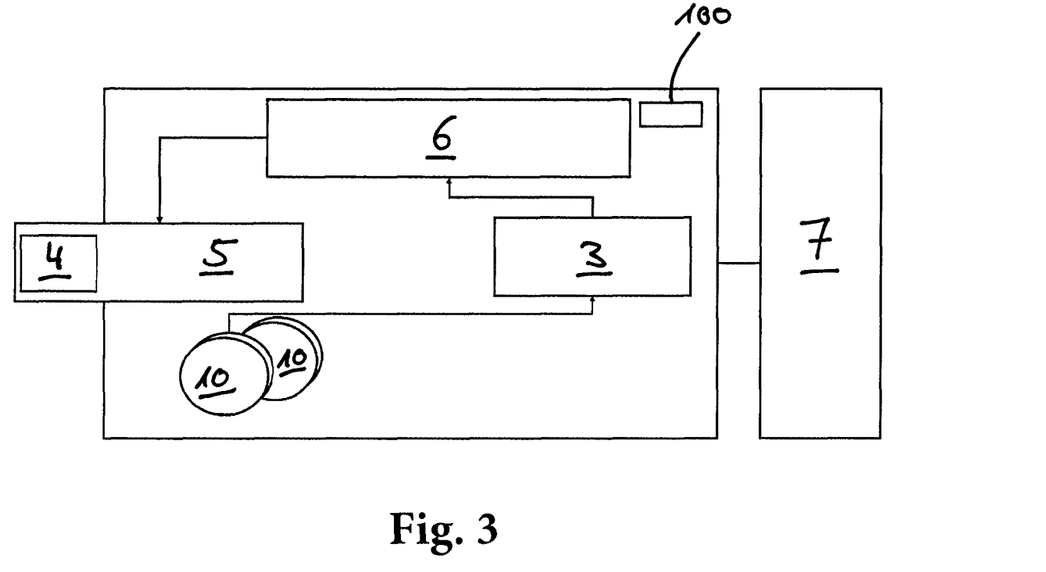
FIG. 3 shows a block scheme of the vehicle of FIG. 1.

FIG. 3 illustrates a block scheme of the presently proposed vehicle 100 shown in FIGS. 1 and 2. The vehicle 100 comprises the sensor unit 3, the movable weight 4, the actuator system 5, the control unit 6 and the wheels 10. The vehicle 100 is coupled with the implement 7. The accelerated wheels 10 provide traction force in order to perform the agriculture or forestry task. The sensor unit 3 detects the load sensor signals indicative of the current load on each wheel 10, the first axle 1 and/or the second axle 2. The control unit 6 receives the detected load sensor signals from the sensor unit 3 and transmits a processed signal based on the load sensor signals to the actuator system 5. The actuator system 5 moves the movable weight 4 according to the received processed signal from the control unit 6.

Figure 4:
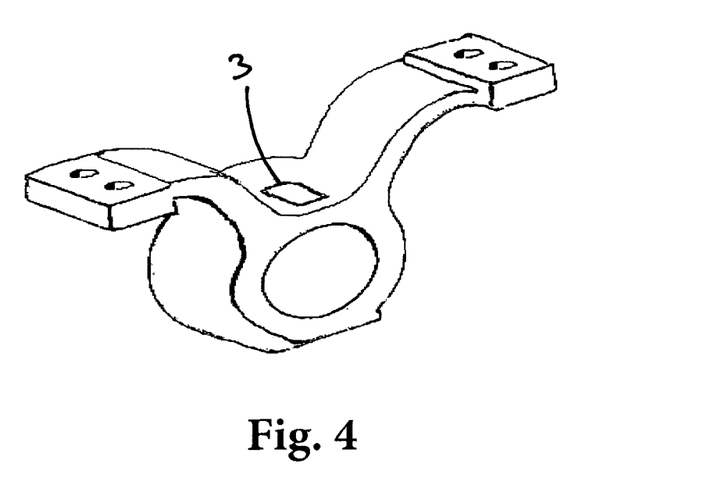
FIG. 4 schematically shows an axle bearing support including a sensor unit.

FIG. 4 schematically shows a trunnion bearing support for at least one of the first axle 1 and the second axle 2 which may be used in the vehicle 100 shown in FIGS. 1 and 2. The trunnion bearing support comprises a hollow cylinder with two mounting arms extending away from each other in parallel to the first axle 1 and the second axle 2. The sensor unit 3 is arranged between the mounting arms of the trunnion bearing support. The sensor unit 3 may comprise a strain sensor and/or a force sensor. The sensors of the sensor unit 3 may be configured to produce real time signals indicative of the vertical force and the horizontal force exerted on the first axle 1 and the second axle 2, respectively.

Figure 5:
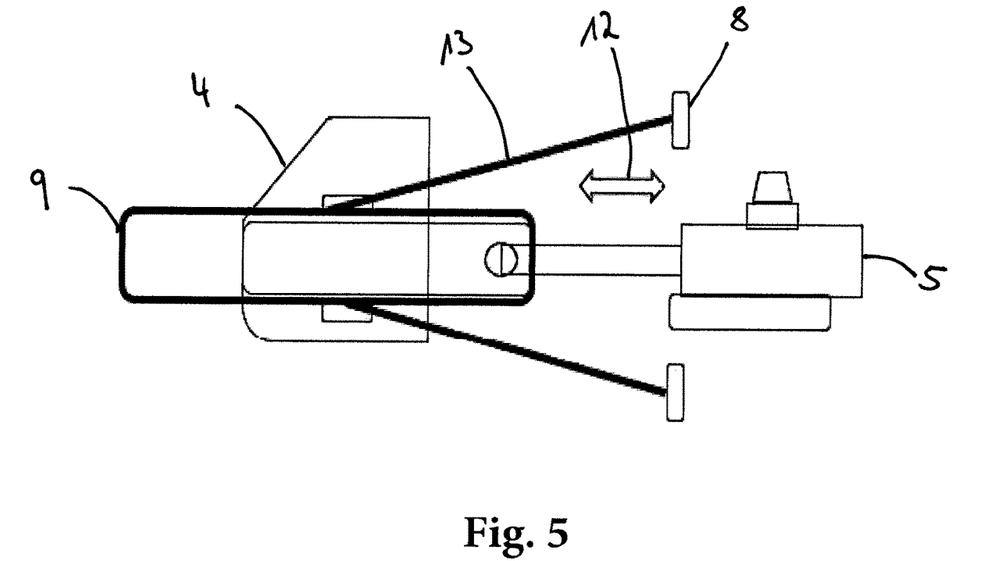
FIG. 5 schematically shows an actuator system and a movable weight of the vehicle of FIG. 1 in a lateral view.

FIG. 5 illustrates a close-up view of the actuator system 5 and the movable weight 4 of the vehicle 100 shown in FIG. 1 in a lateral view. The movable weight 4 is coupled to the slide guide 9. The vertical position of the movable weight 4 is supported by an upper slide guide shell arm 13 which are coupled with the slide guide 9 and a vertically upper portion of the vehicle frame 8 and a lower slide guide shell arm 13 which are coupled with the slide guide 9 and a vertically lower portion of the vehicle frame 8. The actuator system 5 couples with the movable weight 4 and is configured to displace the movable weight 4 in the longitudinal direction 12.

Figure 6:
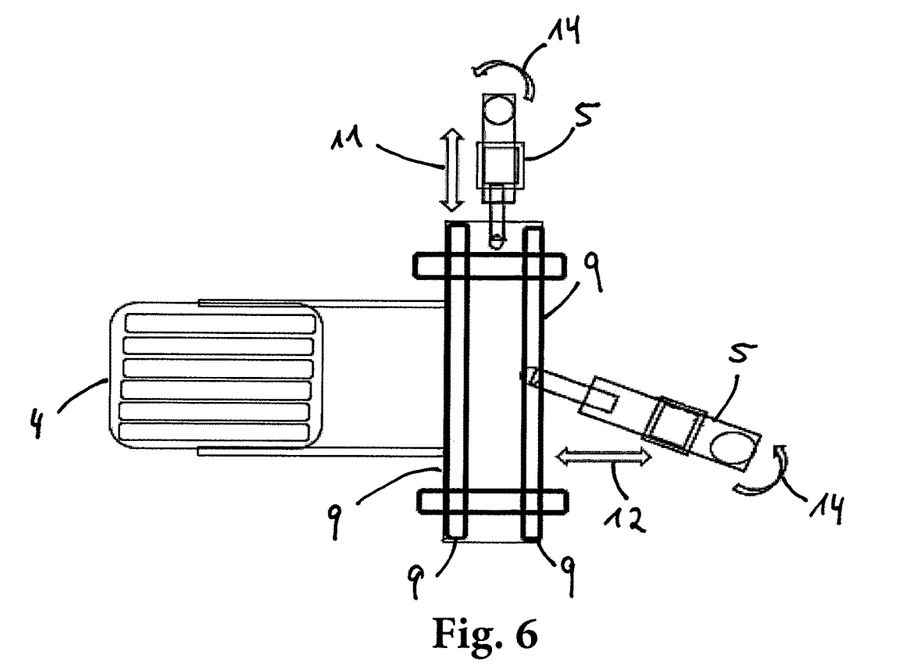
FIG. 6 schematically shows a further embodiment of an actuator system and a movable weight of the presently proposed vehicle in a top view.

FIG. 6 illustrates a further embodiment of an actuator system 5 and a movable weight 4 of the presently proposed vehicle 100 in a top view. The actuator system 5 comprises a longitudinal actuator configured to move the movable weight along a longitudinal slide guide and a lateral actuator configured to move the movable weight along a lateral slide guide. As depicted in FIG. 6, the vehicle 100 comprises, for instance, a bedplate and two lateral slide guides and two longitudinal slide guides. The two lateral slide guides and the two longitudinal slide guides are mounted on the bedplate. The lateral actuator is arranged on a lateral side of the bed plate and extends in the lateral direction 11. The lateral actuator is coupled to one of the two lateral slide guides. The longitudinal actuator is arranged on a longitudinal side of the bed plate opposite to the side of the movable weight 4. The longitudinal actuator extends in the longitudinal direction 12 and is coupled to the longitudinal slide guide which is arranged at the side of the bed plate opposite to the movable weight 4.

The longitudinal actuator and the lateral actuator are rotatably mounted on the vehicle frame 8 (not shown) with respect to a rotation axis 14 in parallel to a yaw axis of the vehicle 100. The rotatably mounted actuators are necessary when the vehicle 100 comprises two or more actuators and/or two or more slide guides 9 in different directions. For example, when the first actuator pushes the movable weight 4 in a longitudinal direction 12, it may be necessary that the second actuator rotatably follows the position of the movable weight 4. Instead of pushing at nothing, for instance, when the movable weight 4 would have been pushed too far by the first actuator, the rotatably mounted second actuator is still capable of pushing the movable weight 4 in the lateral direction 11 by rotatably following the position of the movable weight 4.

Figure 7:
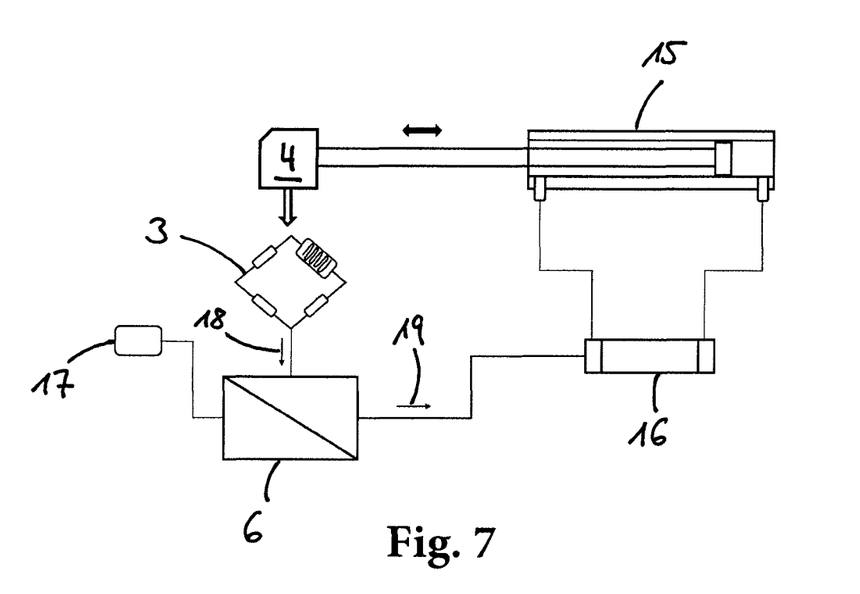
FIG. 7 schematically shows a block diagram of a method of controlling a load distribution of a vehicle.

FIG. 7 illustrates a block diagram of a method of controlling a load distribution of a vehicle 100, in particular of the presently proposed vehicle 100. The method comprises the steps of producing a load sensor signal indicative of a load on at least one of the first axle 1 and the second axle 2 of the vehicle 100 and displacing the movable weight 4 of the vehicle 100 relative to the first axle 1 and the second axle 2 based on the load sensor signal.

Sensor signals such as load sensor signals, attitude sensor signals and/or acceleration sensor signals may be produced by a sensor unit 3 and transmitted as a feedback signal 18 to the control unit 6. The control unit 6 may be coupled to a power supply 17 and may be configured to process the feedback signals 18 into a command signal 19 by determining a current load distribution of the vehicle 100 and comparing the determined load distribution with stored data. When the determined load distribution corresponds to an optimal load distribution given by the stored data, the command signal 19 may be transmitted to a valve 16 of the actuator system 5, for example, a proportional valve, in order to keep the state of the valve 16 unchanged. When the determined load distribution does not correspond to the optimal load distribution given by the stored data, the control unit 6 calculates a target location of the movable weight 4 in order to achieve that the load distribution of the vehicle 100 corresponds to the optimal load distribution given by the stored data and transmits the command signal 19 based on the calculated target location to the valve 16 in order to control the state of the valve 16. When two or more actuators are used to move the movable weight 4, it may be clear, that a at least one single valve 16 for each actuator is necessary and that the control unit 6 transmits at least one command signal 19 for each valve 16.

As also shown in FIG. 7, the actuator system 5 may be a hydraulic actuator including the valve 16 and a hydraulic cylinder 15 which hydraulic cylinder 15 can be controlled by the valve 16. The actuator system 5 may also be another type of a hydraulic actuator or a pneumatic or an electromagnetic actuator. The valve 16 is configured to control the hydraulic cylinder 15 based on the command signal 19 from the control unit 6.

The invention claimed is:

1. A vehicle, comprising:
   a first axle and a second axle, at least one of the first axle and the second axle oriented perpendicular to a longitudinal axis of the vehicle;
   a sensor unit comprising at least one load sensor configured to produce a load sensor signal indicative of a load on at least one of the first axle and the second axle;
   a movable weight configured to be moved relative to the first axle and to the second axle;
   an actuator system comprising a longitudinal actuator and a lateral actuator and the actuator system configured to move the movable weight between a first position located at a first longitudinal distance exterior to a longitudinal end of the vehicle and a second position located at a second longitudinal distance further exterior to the longitudinal end of the vehicle than the first longitudinal distance; and
   a control unit configured to control the actuator system based at least on the load sensor signal;
   wherein both of the longitudinal actuator and the lateral actuator are rotatably mounted on the vehicle and at least one of the longitudinal actuator and the lateral actuator rotates in response to movement of the movable weight by the other actuator.

2. The vehicle according to claim 1, wherein the movable weight is disposed on a front end of the vehicle and the second position of the moveable weight is farther from the front end of the vehicle than the first position.

3. The vehicle according to claim 1, wherein the longitudinal actuator and the lateral actuator move the movable weight in a lateral direction in parallel to the first axle and/or in parallel to the second axle and a second direction parallel with the longitudinal axis.

4. The vehicle according to claim 1, wherein the actuator system includes at least one of a hydraulic actuator, a pneumatic actuator, and an electromagnetic actuator.

5. The vehicle according to claim 1, wherein the actuator system includes at least one hydraulic cylinder and at least one valve for controlling the at least one hydraulic cylinder.

6. The vehicle according to claim 2, further comprising a longitudinal slide guide mounted on the front of the vehicle and extending forward from the front of the vehicle, and
   wherein the movable weight is slidably arranged on the longitudinal slide guide.

7. The vehicle according to claim 6, further comprising a lateral slide guide extending in a lateral direction parallel to the first axle and/or in parallel to the second axle.

8. The vehicle according to claim 7, wherein the at least one of the longitudinal actuator and the lateral actuator is rotatably mounted on the vehicle with respect to a rotation axis in parallel to a yaw axis of the vehicle.

9. A vehicle, comprising:
   a first axle and a second axle, at least one of the first axle and second axle oriented perpendicular a longitudinal axis of the vehicle;
   a sensor unit comprising at least one load sensor configured to produce a load sensor signal indicative of a load on at least one of the first axle and the second axle;
   a movable weight configured to be moved relative to the first axle and to the second axle;
   an actuator system comprising a longitudinal actuator and a lateral actuator and the actuator system configured to move the movable weight along a longitudinal distance exterior to a longitudinal end of the vehicle; and
   a control unit configured to control the actuator system based at least on the load sensor signal;
   wherein both of the longitudinal actuator and the lateral actuator are rotatably mounted on the vehicle.

10. The vehicle according to claim 1, wherein the sensor unit comprises a first load sensor configured to produce a load sensor signal indicative of a load on the first axle, and a second load sensor configured to produce a load sensor signal indicative of a load on the second axle, and
    wherein the control unit is configured to control the longitudinal distance from the longitudinal end of the vehicle via the actuator system based on the first load sensor signal and based on the second load sensor signal.

11. The vehicle according to claim 8, wherein the sensor unit comprises an attitude sensor configured to produce an attitude sensor signal indicative of an attitude of the vehicle, wherein the control unit is configured to control the actuator system based on the attitude sensor signal.

12. The vehicle according to claim 1, further comprising a pitch angle sensor configured to produce a pitch angle sensor signal indicative of a pitch angle of the vehicle, and
    wherein the control unit is configured to control the longitudinal distance from the longitudinal end of the vehicle via the actuator system based on the pitch angle sensor signal.

13. The vehicle according to claim 1, wherein the sensor unit comprises a vertical acceleration sensor configured to produce an acceleration sensor signal indicative of a vertical acceleration of the vehicle, wherein the control unit is configured to control the longitudinal distance from the longitudinal end of the vehicle via the actuator system based on the acceleration sensor signal.

14. A method of controlling a load distribution on a first axle and on a second axle of a vehicle, the method comprising the steps:
 producing a load sensor signal indicative of a load on at least one of the first axle and the second axle; and
 displacing a movable weight using a longitudinal actuator and a lateral actuator and displacing the weight along a longitudinal distance exterior to a longitudinal end of the vehicle, the displacing based on the load sensor signal;
 wherein both of the longitudinal actuator and the lateral actuator are rotatably mounted on the vehicle and at least one of the longitudinal actuator and the lateral actuator rotates in response to movement of the movable weight by the other actuator.

15. The method according to claim 14, further comprising displacing the movable weight in a lateral direction parallel to at least one of the first axle and the second axle.

16. The method according to claim 14, wherein displacing the movable weight comprises displacing the movable weight along a longitudinal slide guide parallel with a longitudinal axis of the vehicle and displacing the movable weight along a lateral slide guide perpendicular to the longitudinal axis of the vehicle.

17. The method according to claim 16, wherein displacing the movable weight along the longitudinal slide guide comprises controlling the longitudinal actuator, and
 displacing the movable weight along the lateral slide comprises controlling the lateral actuator.

18. The method according to claim 14, wherein the moveable weight is located on an opposite side of the vehicle from an implement contacting the ground, and the moveable weight is displaced towards the second position in response to a reduction in load at the first axle or the second axle when the implement is in use.

19. The method of claim 14, wherein the longitudinal actuator is rotatable off axis with a longitudinal axis and the first axle of the vehicle.

\* \* \* \* \*